United States Patent [19]

Uesugi et al.

[11] 4,449,129

[45] May 15, 1984

[54] MULTIPLE POSITION RECORDER

[75] Inventors: Toshiaki Uesugi; Kazutaka Ogitani; Toshikazu Inden, all of Oimachi, Japan

[73] Assignee: Chino Works Ltd., Saitama, Japan

[21] Appl. No.: 357,898

[22] Filed: Mar. 15, 1982

[30] Foreign Application Priority Data

Mar. 20, 1981 [JP] Japan ............................. 56-39602

[51] Int. Cl.³ .................................................. G01D 9/28
[52] U.S. Cl. .................................... 346/61; 346/141; 400/82
[58] Field of Search ................. 101/90, 93.04, 110, 101/78; 400/121, 174, 82; 346/64, 32, 61, 141

[56] References Cited

U.S. PATENT DOCUMENTS

| | | | |
|---|---|---|---|
| 3,195,141 | 7/1965 | Brown et al. | 346/61 |
| 3,295,140 | 12/1966 | Parker, Jr. et al. | 346/34 |
| 3,318,430 | 5/1967 | Boyd | 101/110 X |
| 3,611,412 | 10/1971 | Gibby | 400/175 X |

FOREIGN PATENT DOCUMENTS

52-4863 1/1977 Japan ................................. 346/34

*Primary Examiner*—Edgar S. Burr
*Assistant Examiner*—John A. Weresh
*Attorney, Agent, or Firm*—Oblon, Fisher, Spivak, McClelland & Maier

[57] ABSTRACT

A multiple position recorder having mechanisms for rocking a check lever for preventing a dot print wheel or dot and figure print wheels from lowering which is mechanically constructed while the recorders other mechanisms, such as mechanisms for setting the gap of dot printing and figure printing, mechanisms for synchronization with a driving shaft and the like are constructed by electric circuits.

1 Claim, 11 Drawing Figures

MULTIPLE POSITION RECORDER

BACKGROUND OF THE INVENTION

1. Field of the Invention

This invention relates to a multiple position recorder for recording many kinds of data on the same recording paper as a series of dots that are sorted in different colors in accordance with the data.

2. Description of the Prior Art

A recorder of this kind has a large number of input terminals. If the recorder has input terminals among the many input terminals which are not used or which are connected to an input system or systems for which recording is not necessary for the time being, the recording operation of the inputs of these input terminals must be checked or prevented.

The check mechanism employed in the conventional recorder for blocking the recording operation has an inherent reliability problem due to its mechanical complexity. Moreover, it occupies a large space and the position of its installation is limited.

SUMMARY OF THE INVENTION

The present invention has been made to solve these problems. In the present invention, in the check mechanism for the recording operation, only the mechanisms for rocking a check lever for preventing a dot print wheel or dot and figure print wheels from lowering has a mechanical construction whereas the other mechanisms, such as mechanisms for setting the gap of dot printing and figure printing, mechanisms for synchronization with a driving shaft and the like which have conventionally been accomplished mechanically, are constructed by electric circuits. Thus, the present invention is directed to eliminating the large space requirement, to permit relatively free setting of the installation position, to reduce the mechanical load and to improving the reliability.

BRIEF DESCRIPTION OF THE DRAWINGS

The exact nature of this invention, as well as other objects and advantages thereof, will be readily apparent from the following specification relating to the annexed drawings in which.

DESCRIPTION OF THE PREFERRED EMBODIMENTS

The dot figure printing device of the recorder in accordance with an embodiment of the present invention will be now described with reference to the drawings.

In the drawings reference numeral 1 represents a dot and figure print carriage supported in such a manner as to be capable of moving in only its axial direction on a driving shaft 3 which is driven by a motor 2. The driving shaft 3 is supported between side frames 5 of the main frame of the recorder in the direction perpendicular to the direction of travel of recording paper 4. A check bar 6 for controlling the dot figure printing operation of the dot figure print carriage 1 is mounted parallel to the driving shaft 3. As shown diagrammatically in FIG. 1, this check bar 6 is operated by a dot print control motor 42 and a figure print control motor 43 so as to be capable of rocking. A figure print lever 7 and dot print lever 8 of the carriage 1 are positioned in such a relation that the check bar 6 engages with both levers 7 and 8 at the position (I) indicated by chain line in FIG. 1, and the check bar 6 engages with only the figure print lever 7 at the position (II), also indicated by chain line shown in FIG. 1.

Figure 2:
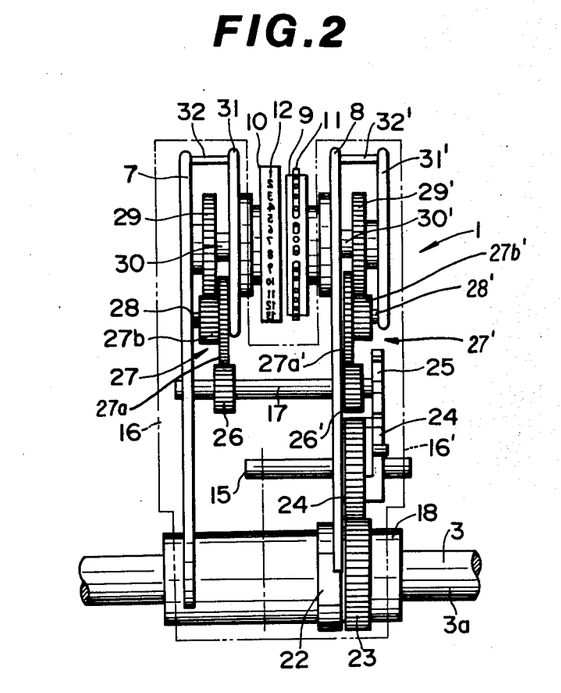
FIG. 2 is a plan view of the dot and figure print carriage.
Figure 3:
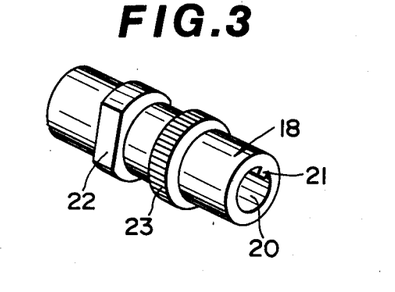
FIG. 3 is a perspective view of the cylinder.
Figure 4:
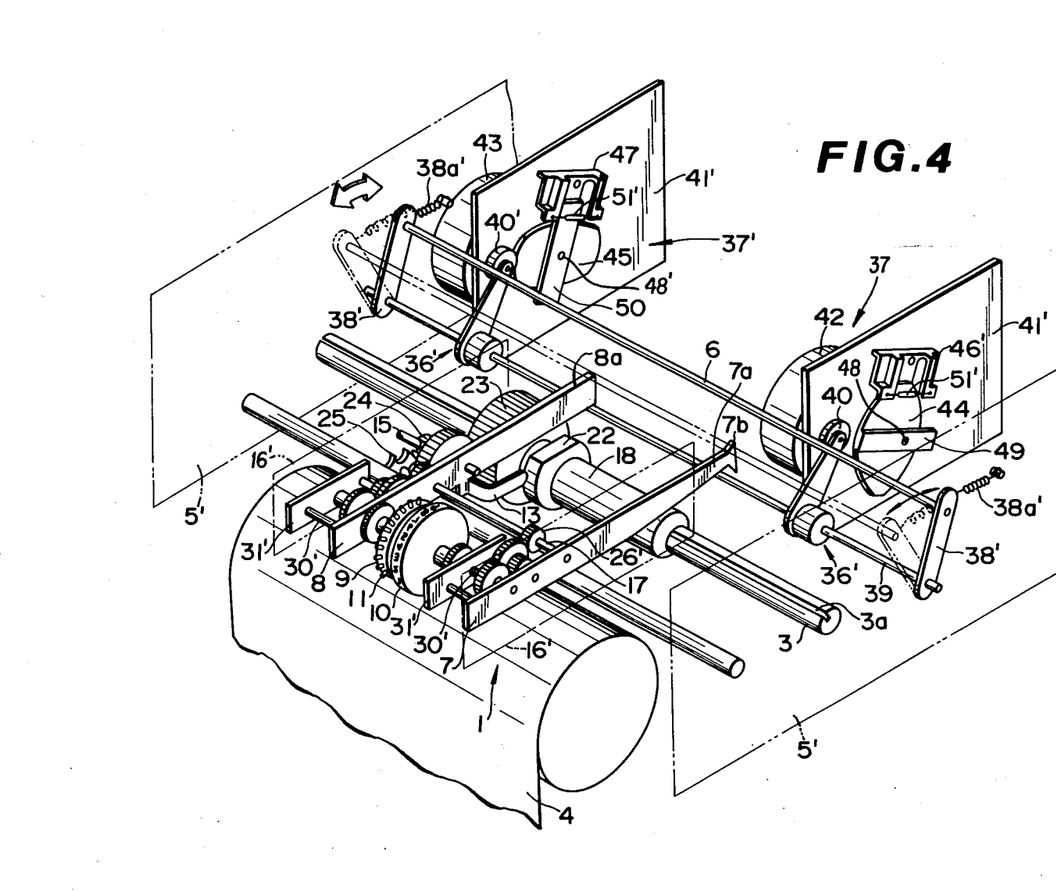
FIG. 4 is a perspective view of the mechanical portions of the recorder.

More particularly, the carriage 1 has a dot print wheel 9 for printing a dot on the recording paper 4 and a figure print wheel 10 for printing a character which is juxtaposed with the dot, as shown in FIGS. 2 through 4. Twelve dot print points for printing . dots and  dots, respectively, or a total of 24 points, are formed on the outer circumference of the dot print wheel 9. Type faces for figures 1 through 24 are formed on the outer circumference of the figure print wheel 10. The dot print wheel 9 and the figure print wheel 10 are positioned close to the tips of the figure print lever 7 and dot print lever 8, respectively, so that the dot print wheel 9 is capable of printing the dots independently. This is accomplished by the combined operation of levers 7 and 8, their support shafts and driving cams, and the check bar 6, as will now be described. The dot print lever 8 extends linearly in plate form from its tip at which the dot print wheel 9 is fitted, and is bifurcated at substantially its intermediate portion. One of the bifurcate portions extends substantially linearly as such from the bifurcation point and serves as an engaging arm 8a which engages with the check bar 6. The other extends downward and rearward in a curved shape and serves as a cam follower lever 13. The dot print lever 8 is supported by a shaft 15 which acts as a fulcrum for both the dot print lever 8 and the figure print lever 7. The figure print lever 7 is connected to the dot print lever 8 by a figure print lever support shaft 17. The shaft 15 is journaled in the carriage frame 16' (i.e., the right-hand carriage frame in FIG. 2 and the left-hand carriage frame in FIG. 4) and in a central, non-illustrated carriage frame indicated by the dotted line in FIG. 2. The shaft 17 is journaled in the figure print lever 7 and the dot print lever 8.

On the other hand, the figure print lever 7 is disposed parallel to the dot print lever 8 and has a plate-like shape extending substantially linearly from its tip, where it has the figure print wheel 10, to its engaging arm 7a at the rear end that engages with the check bar 6. This engaging arm 7a is longer than the engaging arm 8a of the dot print lever 8, and an anchor portion 7b having a shape like a fish tail is formed at the tip of the engaging arm 7. Further, the figure print lever support shaft 17 is turnably fitted near the center of the figure print lever 7 through substantially the center of the dot print lever 8. The distance from the penetrating position of the figure print lever support shaft 17 on the figure print lever 7 to the axis of rotation of figure print wheel 10 is equal to the distance from the penetrating position of the figure print lever support shaft 17 on the dot print lever 8 to the axis of rotation of the dot print wheel 9.

A driving cylinder 18 is turnably fitted to the carriage frames 16, 16'. The driving cylinder 18 is disposed beneath the engaging arm 8a of the dot print lever 8. The abovementioned driving shaft 3 is inserted through an internal hole 20 of this driving cylinder 18. Since a protuberance 21 formed on the wall of this internal hole 20 engages with a groove 3a formed on the outer wall of the driving shaft 3 extending in the axial direction, the driving cylinder 18 rotates integrally with the driving shaft 3 and can move in the axial direction.

A cam 22 and a gear 23 are formed on the outer circumference of the driving cylinder 18. The cam 22 engages with the aforementioned cam follower lever 13, and a part of the outer circumference of the driving cam 22 is cut off so that whenever the cylinder 18 rotates once, the figure and dot print levers 7 and 8 move once in the vertical direction. The driving force of the gear 23 rotates the dot and figure print wheels 9 and 10 via Geneva gears and reduction gears in such a fashion that, whenever the cylinder 18 rotates once, the dot and figure print wheels 9 and 10 are intermittently rotated by 1/24 revolution. More specifically, the gear 23 engages with a Geneva driving gear 24 with a gear ratio of 1:1. The Geneva driving gear 24 is loosely fitted to the shaft 15. The Geneva driving gear 24 is disposed in a Geneva engagement with a Geneva follower gear 25 with a gear ratio of 1:6. The Geneva follower gear 25 is in turn fixed to the figure print lever support shaft 17.

Two gears 26, 26' having the same diameter are fixed to the figure print lever support shaft 17 on the sides of the figure print lever 7 and the dot print lever 8, respectively. The gears 26, 26' engage with increased diameter portions 27a, 27a' of reduction gears 27, 27' respectively. These reduction gears 27, 27' are loosely fitted to shafts 28, 28' formed on the levers 7, 8 of reduction gears 27, 27', respectively. Reduced diameter portions 27b, 27b' engage with wheel axial gears 29, 29', respectively. The wheel axial gears 29, 29' are fixed to wheel shafts 30, 30', which are integral with the figure print wheel 10 and the dot print wheel 9, 10, 9, respectively.

The overall gear ratio from the Geneva follower gear 25 to the wheel axial gears 29, 29' via the reduction gears 27, 27' is 1:4. Reference numerals 31, 31' represent reinforcing plates that are fitted to reinforcing shafts 32, 32' and to shafts 28, 28' parallel to the levers 7, 8, respectively, so as to pivotally support the wheel shafts 30, 30'.

Figure 5:
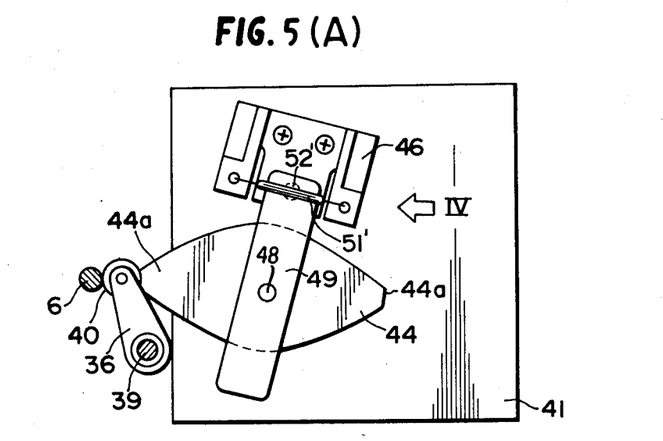
FIGS. 5(A) and 5(B) are front views of the dot and figure print check cams, the figure print check cam and the position detectors.

The dot and figure print control mechanism for controlling the dot and figure print levers 7 and 8 will now be described with reference to FIGS. 4 through 6.

Broadly speaking, the dot and figure print control mechanism consists of the check bar 6 for checking the dot and figure print levers 8, 7, operation arms 36, 36' which operate in an interlocking arrangement with the check bar 6, and cam driving mechanisms 37, 37' for operating the arms 36, 36' in response to operating signals.

The check bar 6 extends between the two side frames 5, 5'. The two ends of the check bar 6 are fixed to the tips of rocking arms 38, 38'. The base portions of the rocking arms 38, 38' are fixed to a support shaft 39 which extends between and turnably fitted in the side frames 5, 5'. Springs 38a, 38a' are interposed between the rocking arms 38, 38' and the side frames 5, 5', respectively, so as to urge the rocking arms 38, 38', and thus the check bar 6, rearward towards the back of the recorder. One end of each of the operation arms 36, 36' is inserted into the support shaft 39 and a roller 40, 40' is turnably fitted to the other end of each of the operation arms 36, 36'. As explained hereinafter, the rollers 40, 40' on the operation arms 36, 36' are used to push the check bar 6 towards the front of the recorder.

Each of the cam driving mechanisms 37, 37' consists of a mechanism plate 41, 41' erected parallel to the side frames 5, 5'; a dot print control motor 42 or a figure print control motor 43 fitted to one side surface of the mechanism plate 41 or 41', respectively; a dot and figure print check cam 44 or a figure print check cam 45 fitted to the other side surface of the mechanism plate 41 or 41', respectively, so as to operate in an interlocking arrangement with the dot print control motor 42 or the figure print control motor 43, respectively; and a position detector 46 or 47 positioned above the dot and figure print check cam 44 or the figure print check cam 45 on the mechanism plates 41 or 41', respectively.

The mechanism plates 41, 41' are disposed close to the respective operation arms 36, 36', in such a manner that the guide surfaces of the dot and figure print check cam 44 and the figure print check cam 45, to be described below, come into contact with the outer circumferential surfaces of the rollers 40, 40' of the operation arms 36, 36'.

As shown in FIG. 5(A), the guide surface of the dot and figure print check cam 44 has a substantially elongated ellipsoidal shape with portions 44a, 44a projecting in the opposing direction. The dot and figure print check cam 44 is connected to the dot print control motor 42 in an interlocking arrangement by driving shaft 48. A cover plate 49 of a flat platelike reed switch 51 is fitted to the driving shaft 48 of the dot print control motor 42 with a gap D (shown in FIG. 6) between them. The longitudinal direction of the cover plate 49 lies in the direction perpendicular to the major axis of the dot and figure print check cam 44. The cover plate 49 of the reed switch 51 and the dot and figure print check cam 44 rotate integrally with a 90° phase between them.

As shown in FIG. 5(B), the guide surface of the figure print check cam 45 similarly is an ellipsoidal shape with portions 45a, 45a' projecting in opposing directions, and figure print check cam 45 is similarly connected to the figure print control motor 43 in an interlocking arrangement by a driving shaft 48. A cover plate 50 similar to the cover plate 49 of the reed switch 51 is disposed with a gap D (shown in FIG. 6) between it and the cam 45. The longitudinal direction of the cover plate 50 lies in the direction substantially perpendicular to the direction of the major axis of figure print check cam 45. The cover plate 50 and the figure print check cam 45 also rotate integrally with a 90° phase between them.

Figure 7:
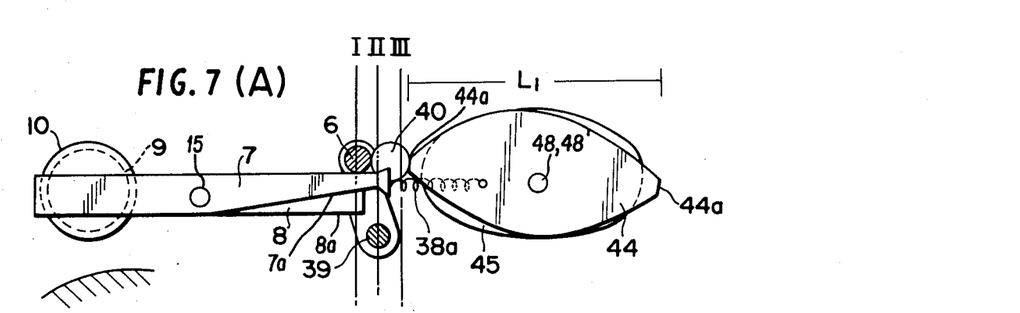
FIG. 7 is a schematic view useful for explaining the operation of the dot and figure print check mechanism.

As shown in FIG. 7, the length $L_1$ of the major axis connecting the projecting portions 44a, 44a' of the dot and figure print check cam 44 and the length $L_2$ of the major axis connecting the projecting portions 45a, 45a of the figure print check cam 45 satisfy the relation $L_1 > L_2$, while the length $L_3$ of the minor axis of the dot and figure print check cam 44 and the length $L_2$ of the major axis of the figure print check cam 45 satisfy the relation $L_2 > L_3$. Accordingly, the sequence of the guide surfaces that come into contact with the rollers 40, 40' is such that the projecting portion 44a of the dot and figure print check cam 44 first comes into contact and then the projecting portion 45a of the figure print check cam 45 does. However, the driving shaft 48 of the dot print control motor 42 and the driving shaft 48' of the figure print control motor 43 are colinearly aligned.

The position detectors 46, 47 are disposed at slantly rearward positions above the dot and figure print check cam 44 and the cover plate 49 and above the figure print check cam 45 and the cover plate 50, respectively.

Figure 6:
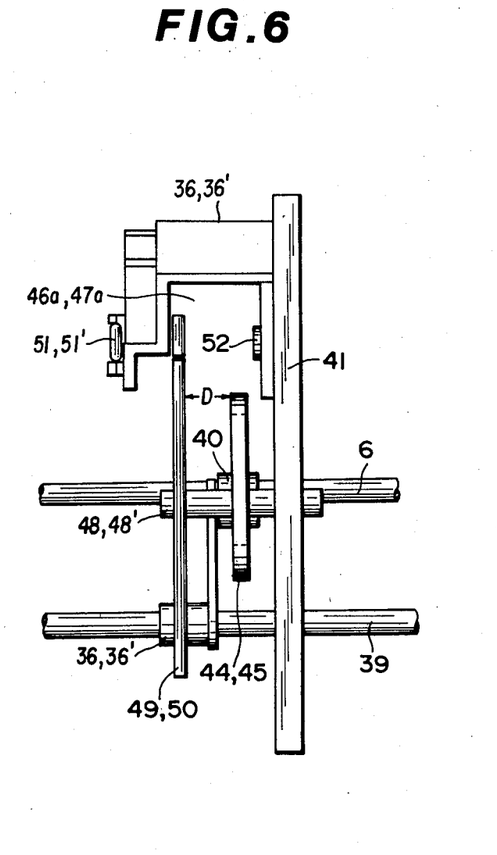
FIG. 6 is a side view from the direction indicated by an arrow IV in FIGS. 5A and 5B.

Each position detector 46, 47 has a through-gap portion 46a, 47 into which the corresponding one of the cover plates 49, 50 is inserted, as shown in FIG. 6. Reed switches 51, 51' and magnets 52, 52' are fitted on the two sides of this through-gap portion 46a. The rotary tip of the dot figure print check cam 44, the cover plate 49, and the rotary tip of the figure print check cam 45, and the cover plate 50, all having their centers of rotation at the driving shafts 48, 48' of the print control motors 42, 43, come into the through-gap portions 46a, 47a interposed between the reed switches 51, 51' and the magnets 52, 52' with a 90° phase with respect to one another in arrangement such that when the cover plates 49 and 50 are positioned between the reed switch 51 and the magnet 52 and the reed switch 51' and the magnet 52' respectively, the reed switches 51, 51' are turned off. Correspondingly, when the rotary tips 44a and 45a of the print check cams 44 and 45 are positioned between the reed switch 51 and the magent 52 and between the reed switch 51' and the magnet 52', respectively, the reed switches 51, 51' are turned on.

Figure 8:
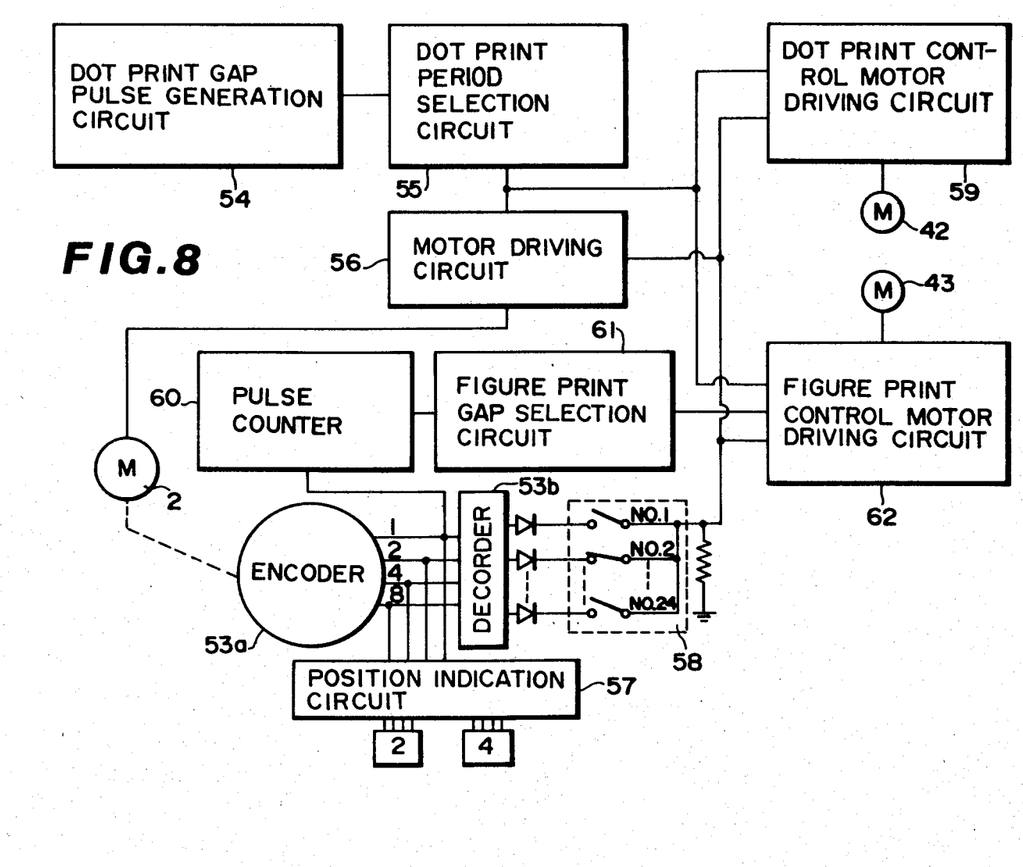
FIG. 8 is a block diagram of the driving circuit of the recorder.

On the other hand, the driving shaft 3 is connected to a rotary encoder 53a shown in FIG. 8 as the position detector. An absolute type rotary encoder is employed as the encoder 53a in this embodiment. The encoder is constructed by radially dividing a disc into a plurality of parts, bonding a suitable reflecting paper on the divided parts to form code plates, and disposing light emitting elements and light receiving elements for reading the codes.

The abovementioned dot print control motor 42 and figure print control motor 43 are driven and operated by a circuit shown in the block diagram of FIG. 8. This circuit will now be described.

In the drawing, reference numeral 54 represents a reference dot print gap pulse generation circuit, and the pulse gap generated by the circuit 54 is set to a level greater than the maximum time required to balance the dot and figure print carriage 1. Reference numeral 55 represents a dot print period selection circuit which generates a motor driving signal whenever a varying count number is set by an external operation so that the driving shaft 3 is intermittently rotated once whenever a signal of the selection circuit 55 is applied to the motor 2 via a motor driving circuit 56. The code plates of the encoder 53a, which is rotated in synchronism with the driving shaft 3, are connected in a reduction arrangement so that they rotate intermittently by 15° when the driving shaft 3 rotates once. Twenty-four codes are put to the encoder 53a so that the binary code signals generated by the encoder 53a are switched whenever the driving shaft 3 rotates once. Reference numeral 53b represents a decoder which receives the binary code signals and generates twenty four on-off signals. Reference numeral 57 represents a position indication circuit which converts the binary code into a numeric figure and displays it. Reference numeral 58 represents a group of select switches which selectively switches the twenty four outputs of the decoder 53b by an external operation. Reference numeral 59 represents a dot print control motor driving circuit which drives the dot print control motor 42 when the closing points of the group of switches 58 coincide with the outputs of the decoder 53b. Reference numeral 60 represents a pulse counter which counts the output of the lowermost digit of the encoder 53a, and reference numeral 61 represents a figure print gap selection circuit which receives the output of the pulse counter 60 and generates a figure print control motor driving signal whenever a count number is set by an external operation. Reference numeral 62 represents a figure print control motor driving circuit which drives the figure print control motor 43 by means of a driving signal from the figure print gap selection circuit 61.

The operation of the recorder having the above-described construction will now be described.

The reference pulse signal generated by the reference dot print gap pulse generation circuit 54 is applied to the dot print period selection circuit 55, and the motor 2 is intermittently driven with the time gap set by the dot print period selection circuit 55. Whenever the driving shaft 3 driven by the motor 2 rotates once, a change-over operation is effected between the dot and figure print operation and dot and figure print wheels. That is, the driving shaft 3 driven by the motor 2 rotates the cam 22 of the driving cylinder 18, and when the recess of the cam 22 engages with the cam follower lever 13 due to this rotation, the dot and figure print wheels 9 and 10 rotate about the shaft 15 as their center. Thus the dot and figure print wheels 9 and 10 are made to descend on the recording paper 4 because the tips of the dot and figure print levers 7 and 8 (that is, the dot and figure print wheels 9 and 10) are supported in the upward direction for the time being only by the engagement between the cam 22 and the cam follower lever 13. In this manner, the recording paper 4 is printed on by the types placed at the lowermost positions of the wheels 9 and 10.

Since the cam 22 keeps rotating, the dot and figure print wheels 9 and 10 are lifted, and the dot and figure print carriage 1 is moved in the axial direction in response to the input signals. At this time, the driving force of the gear 23 formed on the outer circumference of the driving cylinder 18 rotates the dot and figure print wheels 9, 10 by 1/24 revolution via the Geneva gears 24, 25 so that the next dot point 11 and figure point 12 are placed at the lowermost positions of the dot and figure print wheels 9 and 10, respectively.

Figure 1:
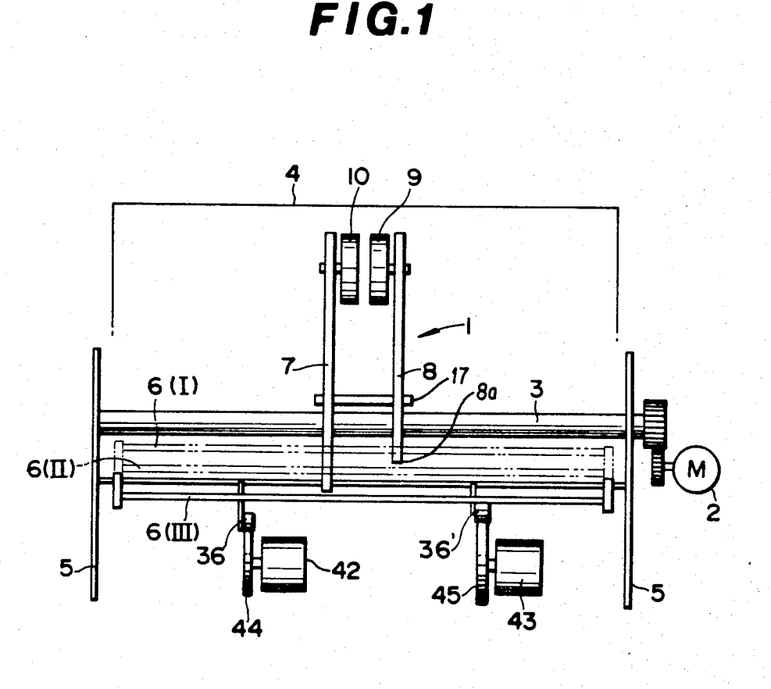
FIG. 1 is a schematic view of the recorder.

However, the abovementioned operation is limited to the state in which the check bar 6 is on line III—III of FIGS. 1 and 7—i.e., as shown in FIG. 7(C). When the wheels 9, 10 are dropped while the check bar 6 is on line II—II, as shown in FIG. 7(B) the dot print wheel 9 rotates with the shaft 15 as its center and drops in the same way as in the abovementioned operation. However, since the upper surface of the engaging arm 7a of the figure print lever 7 comes into contact and engages with the check bar 6, the figure print lever 7 pivots down considerably about the shaft 15 while the figure print wheel 10 at the tip of the figure print lever 7 is pivoted up about the lever support shaft 17. Accordingly, when the check bar 6 is positioned on the line II—II, only the dot is printed and figure printing is prevented.

When the check bar 6 is positioned on the line I—I, as shown in FIG. 7(A) the engaging arms 7a of the figure print lever 7 as well as the engaging arm 8a of the dot print lever 8 come into contact and engage with the check bar 6. Accordingly, both dot and figure print wheels 9 and 10 are prevented from dropping, and only the rotation of the dot and figure print wheels 9 and 10 takes place.

The positions of the check bar 6 on the lines I—I, II—II, and III—III are determined by the on-off control operation of the dot print control motor 42 and The figure print control motor 43 and the concavoconvex positions of the cams 44 and 45. In this embodiment, the concavoconvex positions of the cams 44 and 45 are set such that the check bar 6 is placed on line I—I when both dot and figure print control motors 42 and 43 are off, as shown in FIG. 7(A); on line II—II when only the dot print control motor 42 is kept on, as shown in FIG. 7(B); and on line III—III when both control motors 42 and 43 are kept on, as shown in FIG. 7(C).

Next, the operation of the circuit for driving the control motors 42 and 43 will be described.

First, the code plates of the rotary encoder 53a synchronized with the motor 2 detect the angle of rotation of the motor 2 that is to say, they generate as binary codes the position detection signals corresponding to the dot print point 11 at the lowermost position of the dot print wheel 9 interlocking with the motor 2 and to the type 12 at the lowermost position of the figure print wheel 10 also interlocking with the motor 2, and these outputs are applied to the group of selection switch 58 via the decoder 53b. When the output of the decoder 53b coincides with the No. 1 selection switch of the group of selection switches 58 which is open, for example, no signal is applied to the dot print control motor driving circuit 59 so that the motor driving signal from the dot print gap selection circuit 55 to the dot print control motor driving circuit 59 becomes effective and hence, the dot print control motor 42 rotates by one revolution. The rotation of the motor 42 is stopped by the position detector 46 when the cam 44 is rotated by ½ revolution. The period in which the dot and figure print check cam 44 rotates by ½ revolution is illustrated in FIG. 7(B). During this rotation, the dot is printed.

On the other hand, along with the abovementioned dot printing operation, the digital signal of the lowermost digit of the position detection signal of the encoder 53a is applied to the pulse counter 60 as a position change-over signal. When the counter reaches a number which is n times 24 set externally in the figure print gap selection circuit 61 plus 1, the signal is applied to the figure print control motor driving circuit 62 so that the motor driving signal from the dot print period selection circuit 55 becomes effective, and the figure print control motor 43 is rotated. Rotation of the motor 43 is stopped by the position detector 47 when the figure print check cam 45 is rotated by ½ revolution. The period during which the cam 45 rotates by ½ revolution is shown in FIG. 7(C), and the figure is printed along with the dot. In this manner, since the figure printing operation is effected once for every n times 24 of the dot printing operation plus 1, mutual overlap of the figure print codes can be avoided, and clear recording can be accomplished.

When the output of the decoder 53b coincides with the No. 2 selection switch of the group of selection switches 58 which is closed, for example, the signal is applied to the dot print control motor driving circuit 59, whereby the motor driving signal from the dot print period selection circuit 55 is neglected and the dot print control motor 42 is kept off. Accordingly, as shown in FIG. 7(A), the dot and figure print check cam 44 maintains a steady state in which the line connecting the projecting portions 44a, 44a is kept horizontal, and the roller 40 pushed by the projecting portion 44a pushes the check bar 6 forward to the front side of the recorder against springs 38a and 38a' and brings it under a state in contact with the upper surfaces of the engaging arms 7a, 8a of the dot and figure print levers, respectively. Hence, printing of both the dot and the figure is inhibited.

The abovementioned embodiment is arranged such that, when both control motors 42 and 43 are kept off, printing of both the dot and the figure is inhibited. When only the dot print control motor 42 is kept on, printing of the figure only is inhibited, and when both control motors 42 and 43 are kept on, printing of both the dot and the figure is effected. However, the same operation as in this embodiment can be accomplished by reversing the concavoconvex positions under the steady state of the cams 44 and 45 and also reversing the on-off state of the motors 42 and 43. It is also possible to employ the same arrangement for the cam 45 and the motor 43 as in the abovementioned embodiment, to reverse the concavoconvex position of the other cam 44 under the steady state, and also to reverse the on-off state of the dot print control motor 42 corresponding to the dot and figure print check cam 44. It is preferred that the relation between the concavoconvex positions of the cams 44, 45 and the on-off state of the motors 42, 43 is such that it reduces the load on the control motors 42, 43 during recording. It is possible to reduce the load on the figure prints control motor 43, for example, by using the state shown in FIG. 7(B) as the steady state and the state shown in FIG. 7(A) as the on state for the figure print control motor 43 only in the case of checking the dot and figure printing, because figure print control motor 43 does not need to be operated during ordinary recording.

As described in the foregoing, in accordance with the present invention, only the mechanical portion for rocking the check bar 6 for preventing the dot print wheel or the dot and figure print wheels from lowering is mechanically constructed among the recording check mechanisms and the other mechanisms, such as setting mechanisms for setting the gap of the dot print or the dot and figure print and the mechanisms for establishing synchronization with the driving shaft, which have conventionally been done mechanically, are done by an electric circuit. Accordingly, the mechanical portion is constructed extremely simply and, hence, the mechanical load is reduced greatly and reliability is improved correspondingly. Moreover, the device does not occupy a large area, and the installation position can be set relatively freely.

The recorder in accordance with the present invention includes dot and figure print control motors and cams rotated by the motors and operating the check bar. According to this arrangement, the load on the control motors can be reduced by properly setting the relation between the concavoconvex positions of the cams and the on-off of the control motors in accordance with the number of inputs of the recorder.

Obviously, numerous modification and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. In a multiple position recorder having a carriage capable of controlled movement in a direction substantially perpendicular to the direction of travel of recording paper in accordance with an input control value;

a figure print wheel and a dot print wheel, each disposed inside said carriage and descending to sequentially perform a predetermined at least one of a figure print recording and dot print recording on said recording paper;

a figure print lever and a dot print lever pivotably attached inside said carrier so as to be capable of rocking at least one of said figure print lever, and having said figure print wheel and said dot print wheel pivotably attached at one end of each of said levers, respectively;

and figure print wheel and said dot print wheel being operatively interlocked with a driving shaft extending in a moving direction of said carriage; and     a check bar driven to rock and engage with the other end of said figure print lever and with the other end of said dot print lever in accordance with the rocking position thereof, thereby controlling the vertical descension of at least one of said figure print wheel and said dot print wheel;

the improvement which comprises position detectors connected to said driving shaft for detecting the positions of printed dots and printed figures in synchronism with said driving shaft;

a group of selection switches selected by an external operation;

a dot print control motor driven by a print control circuit for a predetermined period when a output of a selected switch of said group of selection switches coincides with the output of said position detector;

a figure and dot print check cam rotated by said dot print control motor and rocking said check bar to thereby effect said vertical descension of at least one of said dot print wheel and said figure print wheel;

a figure print gap selection circuit for detecting position change-over signals obtained from said position detectors and generating a signal whenever said detected change-over signals equal a predetermined value;

a figure print control motor driven for a predetermined period by the output signal of said figure print gap selection circuit; and     a figure print check cam rotated by said figure print control motor to rock said check bar to thereby affect said vertical discension of at least one of said dot print wheel and said figure print wheel.

* * * * *